Feb. 4, 1964

M. PLAUT 3,120,341

ADDING MACHINE

Filed Dec. 21, 1960

INVENTOR.
MICHAEL PLAUT

BY
OSTROLENK, FABER, GERB & SOFFEN

ATTORNEYS

Feb. 4, 1964    M. PLAUT    3,120,341
ADDING MACHINE
Filed Dec. 21, 1960    5 Sheets-Sheet 2

INVENTOR.
MICHAEL PLAUT
BY
OSTROLENK, FABER, GERB & SOFFEN
ATTORNEYS

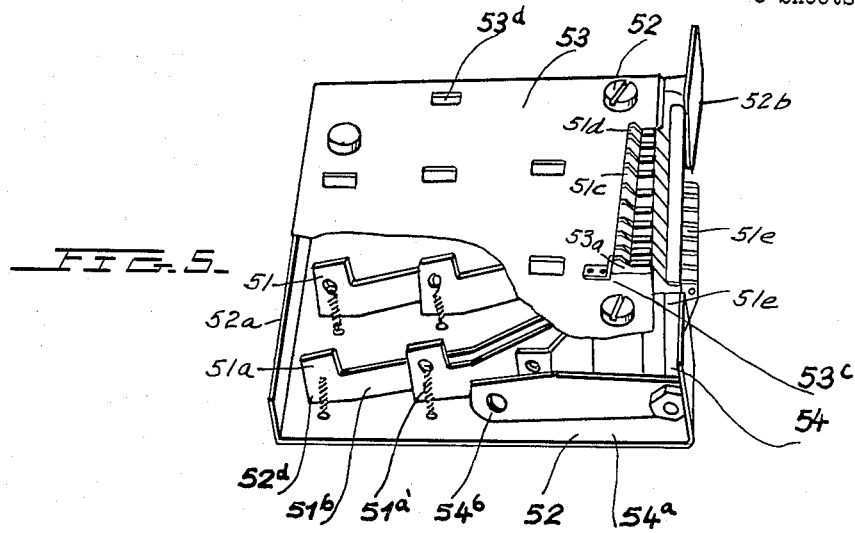
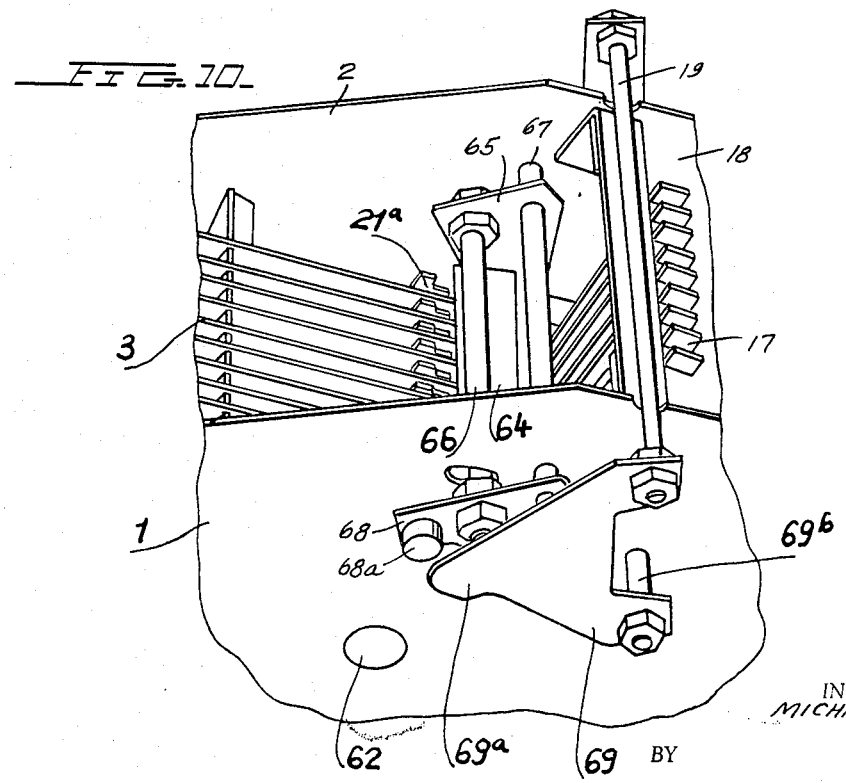

Feb. 4, 1964 M. PLAUT 3,120,341
ADDING MACHINE
Filed Dec. 21, 1960 5 Sheets-Sheet 4

INVENTOR
MICHAEL PLAUT
By
OSTROLENK, FABER, GERB & SOFFEN
ATTORNEYS

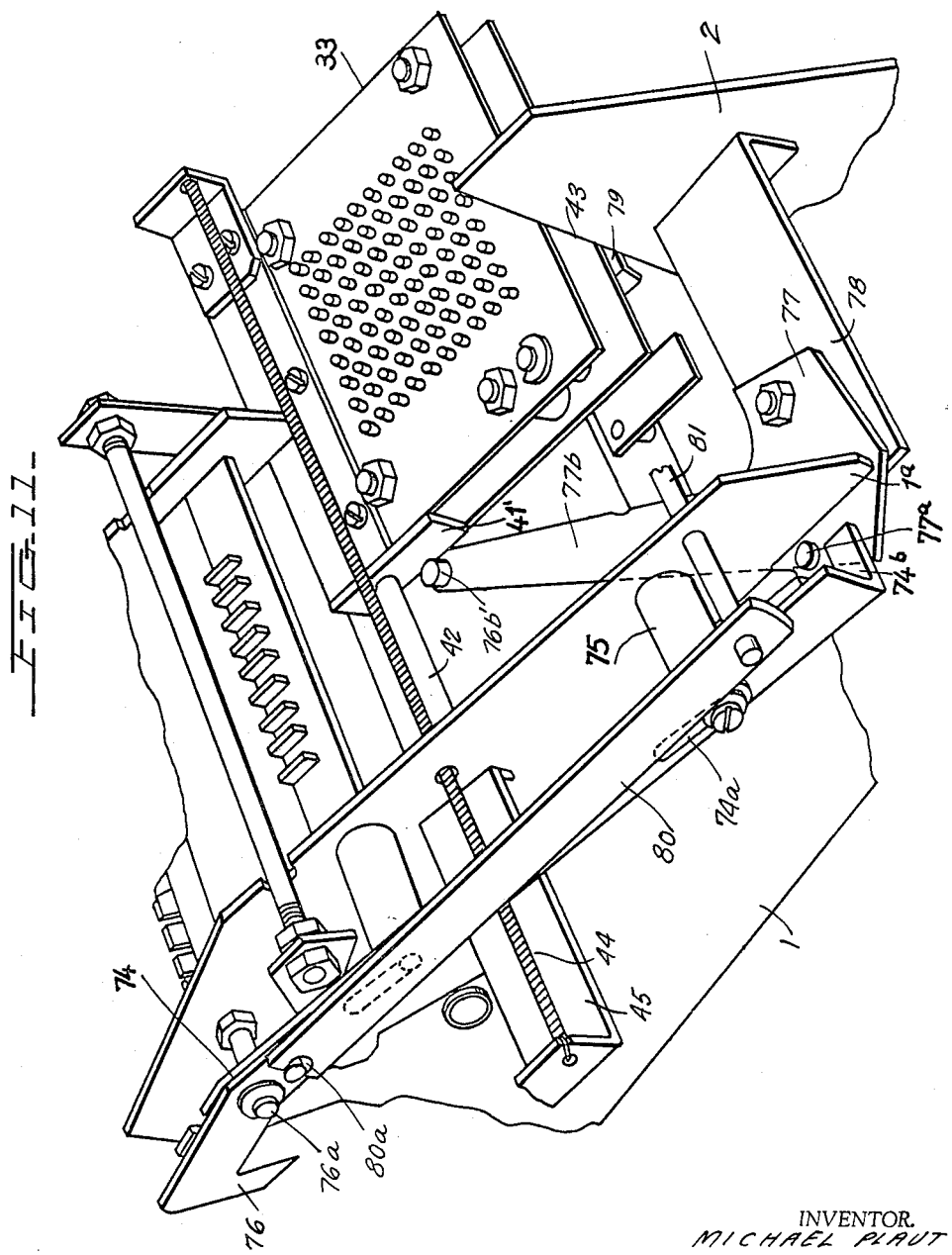

United States Patent Office 3,120,341
Patented Feb. 4, 1964

3,120,341
ADDING MACHINE
Michael Plaut, Zahala, Tel Aviv, Israel, assignor to National Research Development Corp., London, England
Filed Dec. 21, 1960, Ser. No. 77,438
Claims priority, application Israel Jan. 4, 1960
1 Claim. (Cl. 235—60)

This invention relates to adding machines. The term adding machines is known in the trade to designate those machines by which the following operations can be performed: adding, subtracting, totalling, subtotalling, multiplication, and printing numbers which are not added.

The known adding machines are for general office use and are comparatively large, sturdy machines which are not easily transportable. They comprise in particular complicated mechanisms of many parts and are consequently expensive to manufacture and to repair.

There has long been a need for a small, compact adding machine which is light in weight and cheap to produce so that small enterprises can afford to own one in order to make their accounting simple and easy.

It is the object of the present invention to provide an adding machine which is constituted by simple mechanisms comprising fewer parts than in known adding machines and, as a consequence, are light in weight, easy to assemble, smoothly operating and cheap to manufacture and to maintain.

The invention consists in an adding machine comprising a plurality of juxtaposed elongated thin adding bars being mounted for longitudinal forward and return reciprocal movement between two assembly plates; two sets of serrated intermeshing registering wheels adapted to engage the adding bars in accordance with the operation to be performed; one ten-transfer member associated with each adding bar; pins, mounted in a carriage and being adapted to be selectively depressed by any of ten keys in a keyboard governing the extent of forward movement of the adding bars; a locking mechanism actuated by control means governing the engagement of the registering wheels; characterised in that each adding bar carries a stop plate at one end and type bars at the other, and is integral with a rack at one longitudinal edge over half its length.

The invention is illustrated by way of example only in the accompanying drawings, in which:

FIG. 5 is a perspective view of the main keyboard in inverted position, part of its bottom plate being broken away.

FIG. 10 shows a partial perspective view as seen from the left of the transfer member return mechanism.

FIG. 11 is a partial perspective view as seen from the front left corner of the machine showing the carriage return mechanism and the multiplication lever arrangement.

Figure 1:
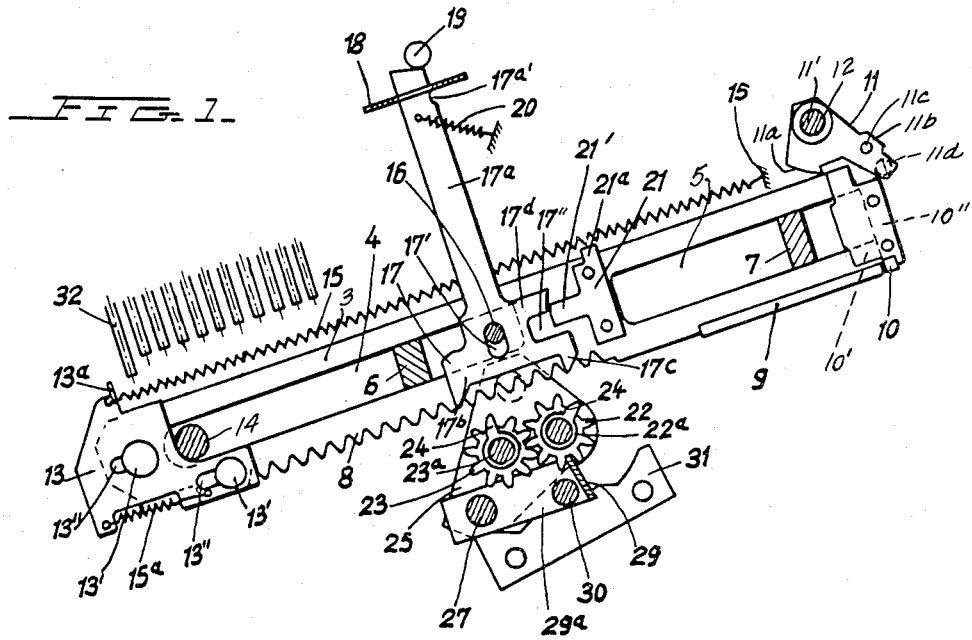
FIG. 1 shows a right side view of an adding bar, ten-transfer member, registering wheels and zero-actuation mechanism, parts extending between the assembly plates being shown in section.
Figures 2A, 2B, 2C:
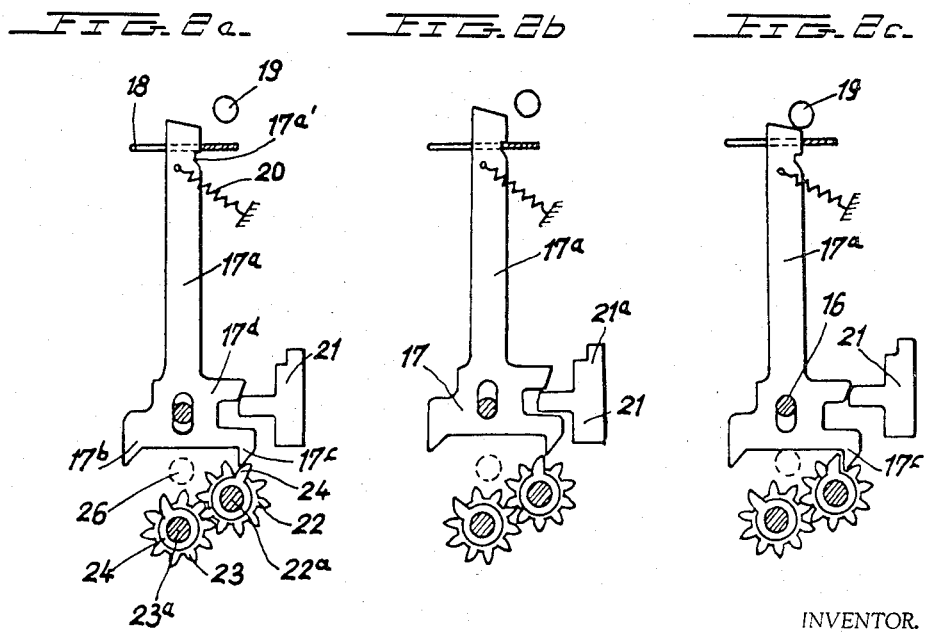
FIGS. 2a, 2b and 2c show the position of the ten-transfer member relative to the add-registering wheels at the beginning of a transfer operation, at the end of same, and during a totalling and sub-totalling operation, respectively.
Figure 4:
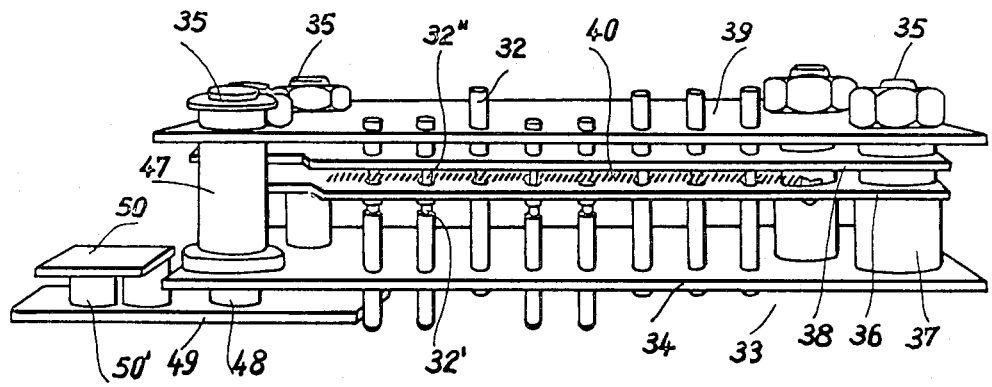
FIG. 4 shows on an enlarged scale a perspective view of the carriage, as seen from the front, all selector pins except those in the first row having been left out for the sake of clarity.

Referring to the drawings and in particular to FIG. 1 the actual operations of adding, subtracting, totalling, subtotalling and printing is done by means of a mechanism which will hereinafter be called for short "adding mechanism."

It comprises in the embodiment of the machine here illustrated nine adding bars 3 which are thin elongated sheet metal strips mounted at a slight angle to the horizontal between the left and right assembly plates 1 and 2, respectively for reciprocal forward and return movement, i.e. a movement toward the back of the machine and a movement returning into the starting position towards the front of the machine. Each bar 3 has an elongated slot 4 in its front section and an elongated slot 5 in its rear section through which extend guide bars 6 and 7 respectively, the guide bars being fixed between the left and right assembly plates for guiding the reciprocal movement of the adding bars 3. The bottom edge of each bar 3 has an integral rack, its teeth 8 extending from near the front of the bar to more than half its length. A type bar 9 is fixed to the rear bottom edge of the bar 3, the bar 9 carrying numbers 1 to 9, the 1 being near the back of the bar. The distance between the centers of two adjacent numbers is equal to the pitch of the teeth 8. The number 0 is integral with the bottom of a zero-carrying member 10 which comprises two plates 10' vertically slidingly arranged on either side of bar 3 by being riveted to each other with the interposition of a spacer 10" having substantially the thickness of a bar 3. The central part of a front edge of one of the plates 10' is bent sidewards to extend into rear slot 5 of bar 3 so that when member 10 slides up and down relative to the rear edge of the bar 3, it is guided thereby and is prevented from falling off.

Above zero-carrying member 10 the zero-actuating lever 11 is pivotally mounted on an axle 12 fixed between the left and right assembly plates. The lever 11 is constituted by a flat plate to which a bushing 11' by which the lever is mounted, is fixed. The lever 11 comprises a cam face 11a at its bottom edge and a lug 11b extending sideways to the left from its top edge. In one plane with the bottom face of the lug 11b and extending to the right of lever 11 is a stud 11c which when all the levers are aligned on the axle 12 extends below the lug 11b of the juxtaposed lever at its right. At the back end of the lever a fixed stud 11d extends to the left and in the position of rest of the bar 3 rests on the rear top corner of the latter. As one bar 3 moves frontwards rotating the lever 11 associated with it, the latter moves all the levers 11 on its right in the manner of a chain action, i.e. the stud 11c of one lever lifts the lug 11b of the lever on its right and so on. If the bars 3 associated with the levers on the right have also been moved frontwards, then the turning of lever 11 does not bring about any actuation of the zero plate. If, however, the bars 3 to the right of the moved bar have not been actuated, then cam faces 11a of the levers 11 lying to the right engage the top of the members 10 lying to the right and prevent them from rising so that zeros are printed when a printing platen presses against them. A suitably designed printing platen holding a paper roll and a typing ribbon (not shown) presses against the type bar 9 at the appropriate time in the calculating cycle and gives an inked impression. If the adding bar is in a zero position, the platen presses against the zero carrying member 10. This member moves upwards with the platen if member 10' does not prevent it from doing so by abutting against the cam surface 11a. When zero carrying member 10 moves upwards with the platen, no pressure is exerted and no print results. If, however, it is prevented from moving upwards by abutting against the cam surface 11a of the zero actuating lever 11, it presses just as the other members on type bar 9 and gives an impression. As described, lever 11 comes into operating position, i.e., preventing zero carrying member 10 from moving up by the forward movement of any adding bar 3 to the left through a "chain reaction."

At the front edge of bar 3 and on its right side—the directions of right and left are always taken with respect to the mounted position of the bars—a substantially L-shaped stop plate 13 is slidingly fixed in longitudinal direction by being held by two rivets 13' extending from the bar 3 into longitudinal slots 13" in the plate 13, the operating length of slots 13" being equal to the pitch of teeth 8. The rear edge of plate 13 overlaps the front edge of slot 4 in bar 3 and abuts in the inoperative position, an operation bail 14 extending through the front slot 4 of all bars 3 and through a slot in the right assembly plate 2. A lug 13a integral with and extending from the top of stop plate 13 is bent at right angles thereto toward the left of bar 3. A short coil spring 15a disposed in a cut-out in the bottom of plate 13 is fixed between the latter and an aligned point on the bar 3, urging the plate 13 and bar 3 together. A long coil spring 15 is fixed with one end near the top of plate 13 and extends parallel with the top edge of bar 3, the other end of spring 15 being attached to a fixed member, indicated at 15' mounted between the assembly plates 1 and 2. Substantially in the middle of each bar 3 an axis 16 which extends between both assembly plates engages in a slot 17' of a fork-shaped ten-transfer member 17 whose handle 17a extends upwardly and is guided in suitable slots provided in a transfer member guiding plate 18 fixed between the left and right assembly plates. The top edge of the handle is tapered downward to be engaged by a bar 19 during a totalling operation, the bar 19 being movably mounted between the assembly plates 1 and 2 and being controlled by a control mechanism described in my co-pending U.S. patent application No. 77,437, filed December 21, 1960, and entitled Improvement in Adding Machines. A notch 17a' is provided in the rear edge of the handle 17a and in the inoperative position of member 17 lies just below plate 18. A spring 20 attached to the handle 17a and a fixed part of the machine bypasses the handle downwards and towards the back of the machine. The transfer member 17 has two prongs at its bottom, a front prong 17b and a rear prong 17c. Somewhat above prong 17c a cut-out 17" is provided in the rear end of the transfer member 17 and above cut-out 17" a rearward extension 17d is integral with the member 17, the rear edge of extension 17d slanting slightly downwards and towards the front. Behind transfer member 17 and coplanar with it, a T-shaped transfer locking member 21 is riveted to the bar 3, the foot 21' of member 21 extending forward and abutting extension 17d in the inoperative position of transfer member 17, the distance between the front edge of the head of the cross-web of the locking member 21 and the rear edge of the bottom part of the transfer member 17 being equal to the pitch of the teeth 8. The top of transfer locking member 21 is extended upwards to form an abutment 21a for a purpose to be hereinafter explained.

Below the transfer members 17 the registering wheels of the adding mechanism are disposed. There are two sets of nine registering wheels 22 and 23 each turnably mounted on axles 22a and 23a respectively in such a manner that the two sets are in mesh with one another, the axle 22a with its wheels 22 being associated with the adding operation, while the axle 23a and its wheels 23 are associated with the subtraction operation. Each wheel 22 and 23 has ten teeth, one tooth associated with each of the numbers from 0 to 9 of the printing bar and the zero-carrying member and each wheel has a ring carrying one cam tooth 24 rigidly fixed to its left side, the cam tooth being aligned between the "9" and "0" tooth of the registering wheel. Each registering wheel 22 and 23 is in one vertical plane with an adding bar 3 while its associated cam tooth 24 is in one vertical plane with the transfer member 17 of the adjacent left adding bar 3. The axles 22a and 23a extend between the left and right assembly plates and are fixed at either end in substantially triangular axle mounting plates 25 disposed on the inside adjacent the left and right assembly plates. The plates 25 are pivotally supported in bearings in the left and right assembly plates 1 and 2 respectively by means of gudgeons 26 extending outwardly from their top corner, the right gudgeon extending through the bearing outwardly. The plates 25 are connected to each other at their lowermost corner by a cylindrical bar 27 which together with the plates forms the register wheel carriage which extends to the right of the right assembly plate through an arcuate slot 28 in the latter, being actuated to control the position of the wheel by means of a locking mechanism to be hereinafter described.

The bar 27 constitutes also a pivot axis for the free ends of the legs 29a of a yoke-shaped locking element, the web 29 of the element engaging the row of registering wheels 22 from below and locking them in their inoperative position. A pin 30 extends from the right leg 29a outwardly and engages a cam plate 31 fixed to the inside face of the right assembly plate, the cam face of the plate 31 being so coordinated to the operation cycle that the yoke 29 is disengaged from the wheels 22 before the latter engage the rack 8 of the adding bars.

The adding and the multiplication operation works as follows, it being understood that the forward and backward movements mentioned hereinafter are actually movements in the direction of the back and the front of the machine, respectively. After selector pins and the key marked adding have been depressed the operation bail 14 makes a forward stroke thereby governing the speed of the forward movement of the adding bars and allowing the spring 15a to draw the stop plate 13 a distance of one tooth width towards the bar 3 whereupon the entire adding bar moves forward by the action of spring 15 until lug 13a abuts against a depressed selector pin 32, to be hereinafter described, which now prevents any further forward movement of bar 3. At this moment the number is printed by the printing mechanism described and claimed in my co-pending U.S. patent application No. 77,436, filed December 21, 1960, and entitled Improvements in Printing Mechanism for Adding Machines and the Like, while the adding wheel 22 is unlocked, being swung away from locking element 29 and is brought into register with the teeth 8. Thereafter the adding bar is returned back to its starting position, the locking plate 13 being forced by the backwards moving operation bail 14 to move an additional distance of one tooth width. During this return movement of the bar 3 the engaged wheel 22 is turned by the teeth 8 for the number of teeth the bar 3 has to move back in order to get into its starting position. After the return movement of the bar, the wheels 22 are disengaged from teeth 8 and are again locked by the locking element 29, the wheel 22 together with cam tooth 24 having assumed a new angular position relative to its starting position, which angular position will be retained until a new calculating operation is to be carried out.

If in the course of an addition, a wheel 22 requires initiation of a tens transfer, the cam tooth 24 strikes the rear edge of prong 17c of the transfer member 17 of the adding bar 3 lying to its left. This transfer member 17 is lifted upwards, the bar 19 having been moved away by the control mechanism from the top of its back edge, whereby notch 17a catches in plate 18 and is held in this position by spring 20. Owing to the lifting of transfer member 17, the foot 21' of the locking element 21 associated with this transfer member can now enter the cut-out 17" due to the bias of spring 15a, whereby the adding bar associated with this transfer member is moved back by the width of one tooth thereby turning the registering wheel of next higher order bar one tooth, i.e. the extra digit. In order to release the transfer member and to return it to its original position shown in FIG. 1 a bar movably mounted between the assembly plates and controlled by the control mechanism abuts against abutment 21a and forces the locking member 21 and thereby the adding bar 3 forward. In this position the bar 19 is actuated to push against the transfer member 17 so that the notch 17a comes out of engagement with the plate 18, the spring 20 now pulling the member 17 down into its original position.

The subtracting operation is achieved in a similar manner, the wheels 23 in this case being brought into register with the teeth 8 before the start of the return stroke of the bar 3. If a number is subtracted which will require a subtractive carry when a wheel 23 has turned one complete revolution, the cam tooth 24 associated with it strikes the rear edge of prong 17b of the transfer member 17 of the adding bar 3 lying to its left. Thereupon the sequence of movements is the same as during the adding operation, the only difference being that the registering wheel 23 in engagement with the adding bar associated with the said transfer member 17 is turned the arcuate distance of one tooth.

The totalling operation is achieved by bringing the register wheels 22 into engagement with the adding bars during the forward movement of the latter and locking the transfer members 17 in their lower-most position. The adding bar can move forward until the tooth 24 strikes against the front edge of prong 17c of the transfer member, whereupon printing takes place. At the same time the wheels 22 are disengaged from the adding bars and the latter are returned to their starting position.

The subtotalling operation is similar to that of totalling except that in this case the register wheels 22 are made to engage the adding bars 3 during both the forward and the return strokes of the latter.

When it is desired to print numbers which are not intended to be added or subtracted, i.e. the so-called non add operation, the register wheels are not brought into register with the adding bars and the latter are allowed to move forward in accordance with the setting of pins 32. At the end of this forward movement printing takes place whereupon the bars 3 are returned to their starting position.

Figure 3:
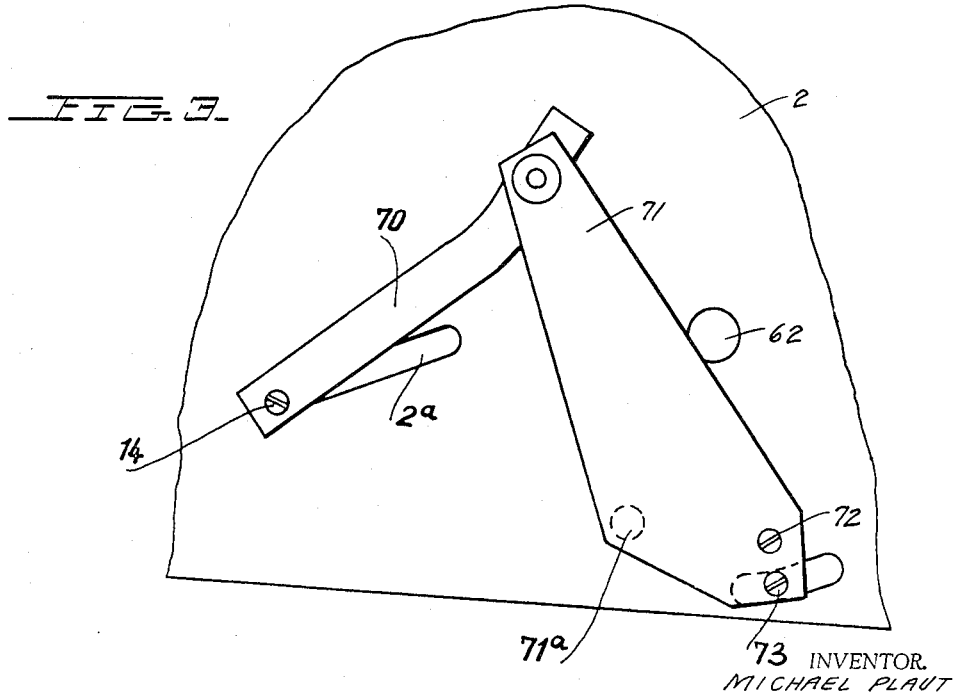
FIG. 3 shows a partial view as seen from the right of the operations bail return mechanism.

The return of the adding bars is brought about by the operations bail 14 which is actuated by two sets of identical levers on the outside of both right and left assembly plates, the set on the right side of the machine being illustrated in FIG. 3.

To the end of the operation bail 14 which extends through a slot 2a in the right assembly plate 2 is fixed one end of an intermediary lever 70 whose other end is pivotally connected to the lever 71 turnable on axle 72 which extends between the levers 71 on both sides of the machine, a spacing bar 73 being likewise fixed between the levers on both sides. The lever 71 carries a cam follower 71a which is in engagement with a cam (not shown) mounted on main control axis 62, the cam being synchronized to the operation cycle of the machine to govern the movement of the operations bail 14 through the movement of the follower 71a on its cam surface.

As has been mentioned hereinbefore, the extent of forward movement of the adding bars for the adding and subtracting operation is determined by depressed selector pins 32 against which the lugs 13a of stop plates 13 abut. These selector pins are disposed in a carriage, generally indicated at 33, which, besides holding the pins 32, is provided with a means for preventing the movements of inoperative adding bars, i.e. those of higher digits.

In the embodiment of the adding machine illustrated eight columns of ten selector pins 32 each are provided in the carriage 33, the pins in each column representing the numbers from 0 to 9, while the number of columns represents the maximum number of digits possible in any number to be added, i.e. eight digits. The pins 32 are cylindrical, having a flat top surface and a semi-spherical bottom surface. They are provided with two annular grooves along their length, i.e. a bottom groove 32' and a top groove 32''. The pins are vertically movable in the carriage 33 which is constituted by a rectangular bottom plate 34 having an upwardly extending post 35 at each of its corners. A bottom intermediate plate 36 is mounted on posts 35 above bottom plate 34 with the interposition of spacers 37. Above the bottom intermediate plate 36 a top intermediate plate 38 is mounted on the posts 35 with the interposition of spacers 37 and a top plate 39 is likewise mounted on the posts 35 above the top intermediate plate 38, likewise with the interposition of spacers 37. All the plates 34, 36, 38 and 39 have eight aligned columns of ten apertures each for the disposition of the selector pins 32 which in their inoperative position extend beyond the top plate and have their grooves 32'' located in the space between the top and the top intermediate plates. The pins are prevented from falling out of the plates by coiled springs 40 fixed to the top of the bottom intermediate plate 36 and wound in a snake-like manner around the pins so that each spring 40 will engage in a section of the bottom groove 32' of one row of pins in their inoperative position. In the operative position of the pins, i.e. when they are pressed downward (as will hereinafter be described) the springs 40 will engage the top groove 32''.

To the rear end of the top plate 39 a strip 41 is fixed whose ends are bent downwardly to form side flanges 41', substantially flush with the bottom plate. Aligned central apertures are provided in flanges 41' through which axis 42 extends, axis 42 being rigidly fixed in the left assembly plate 1 and extending through an aperture in the right assembly plate outwardly and having a nut 42' at its end.

The carriage 33 is movable laterally stepwise from its inoperative position at the right of the right assembly plate 2, i.e. when the right side flange 41' is near nut 42', to the eight different possible operative positions towards the left assembly plate through a suitable cut-out 43 in the right assembly plate. It is urged into the various operative positions by a spring 44 against a stop fixed with one end to the right rear corner of the carriage and extending through an aperture in the left assembly plate 1 to be fastened with its other end to a bracket 45 fixed to and extending to the left of the plate 1.

On the left front corner of the carriage a hollow bushing 47 extends through and is fixed to apertures in the plates 34 and 39, the corners of plates 36 and 38 being cut out to make room for the bushing. A pin 48 is vertically slidable in bushing 47 having a locking ring at its top end to prevent its falling out of the bushing. To the bottom of pin 48, which in its position of rest extends somewhat below the bottom plate 34 and parallel with the front edge of the carriage a strip 49 is fixed extending to the left of the carriage for the purpose of blocking the movement of those adding bars which are not to be actuated during an adding operation by abutting against the lug 13a of the stop plate 13. Normal to the strip 49 and extending from its front a strip 50 is fixed spacedly above strip 49 by means of two studs 50' for unlocking the adding bars during a totalling operation by raising strip 49, so that the adding bars may pass beneath it, the raising of strip 49 being accomplished by a control mechanism described in my aforementioned co-pending U.S. patent application No. 77,437.

The numbers to be added or subtracted, i.e. the depression of the selector pins 32, are put into the adding machine by pressing down on the number keys, as known per se. In the embodiment illustrated in FIG. 5, the ten number keys 51 comprising uprights 51a to whose tops the push buttons are fixed and integral laterally extending arms 51b are lodged between two plates constituting the main keyboard, i.e. the upper plate 52 being adapted to be fixed by means of a continuous downwardly turned flange 52a at its left side to the left assembly plate 1 and by means of downwardly turned flanges 52b at the front and rear ends of its right side to the right assembly plate 2 and the lower plate 53 spacedly fixed to the plate 52 by means of screws and spacers 52c. Both upper and lower plates 52 and 53, respectively, have registering slots 52d and 53d, respectively, in order to guide the vertical movement of the uprights 51a of the keys against the bias of springs 51a' fixed between the uprights 51a and the upper plate 52. The arms 51b of all keys converge so that their free ends which are integral with push members 51c come to lie next to each other in a straight row. Each push member 51c as a downwardly extending lug 51d extending through and being guided in notches 53a in the right edge of plate 53, the lugs being in alignment with the left-most column of pins 32 in the position of rest of the carriage 33 and as the carriage moves stepwise from right to left with each subsequent column of pins 32, so that as a key 51 is pressed down, the lug 51d associated with it depresses the corresponding pin 32. Each push member 51c has furthermore a laterally extending lug 51e which in the key associated with the number 9 extends substantially from the middle of the member 51c while in all the other keys it extends from the top of said member. A bar 54 lies above lug 51e of the "9"-key and below the lugs 51e of all the other keys, being fixed at its ends to arms 54a pivotally mounted at 54b to brackets 53b extending from the lower plate 53. Thus whenever any key 51 except the "9" key is depressed, the lug 51e causes the bar 54 and thus the lug 51e of the "9"-key to be lowered likewise, whereby the pin 32 associated with the depressed key as well as the pin 32 associated with the "9"-key in the same column are depressed. This depression of the "9"-lug with each depression of another number is for the purpose of moving the carriage to the left, as will be explained hereinbelow.

On the underside of plate 53 a downwardly extending lug 53c is fixed next to the notch 53a guiding the lug 51d of the "9"-key. This lug 53c abuts the pin 32 associated with the number "9" of the left-most column of carriage 33, when the latter is in the position of rest. If, however, the said pin 32 is depressed allowing the lug 53c to pass above it, the spring 44 of the carriage moves the latter to the left until the lug 53c abuts the pin 32 associated with the number "9" of the next column. Thus with each depression of any number, the carriage will automatically move one step to the left.

Figure 6:
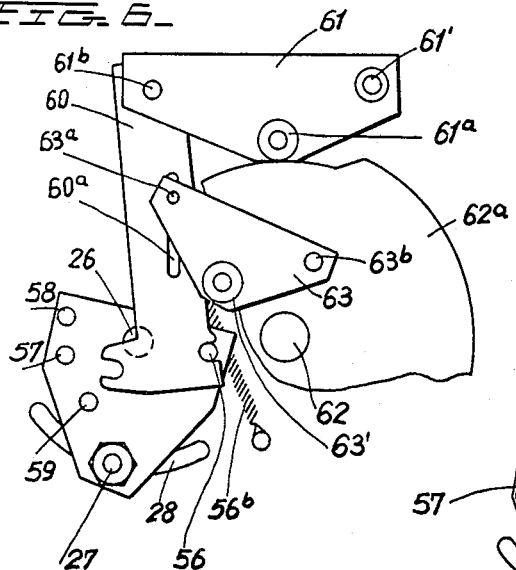
FIGS. 6, 7, 8 and 9 show the positions of register wheel locking mechanism during the operations of adding, subtracting, totalling and subtotalling, respectively.
Figure 7:
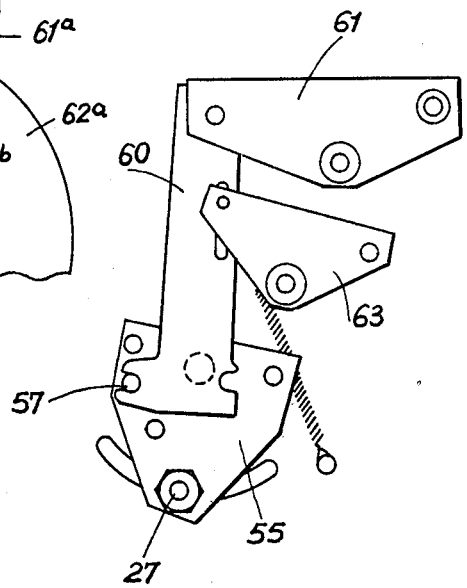
Figure 9:
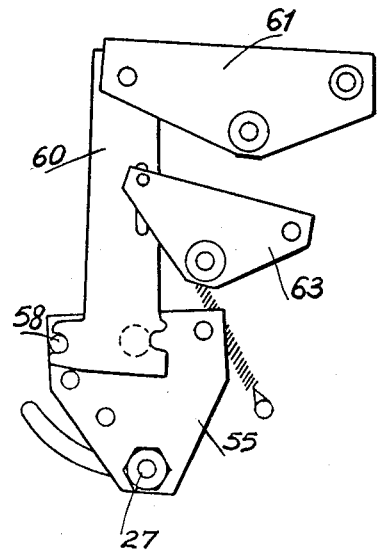
Figure 8:
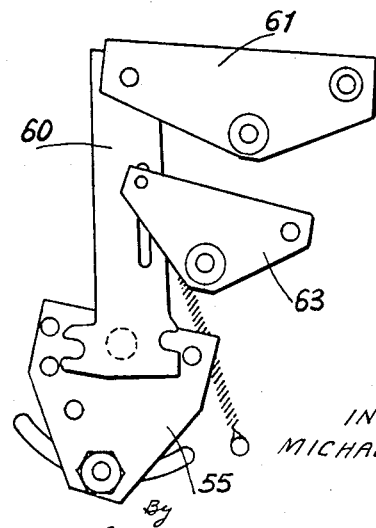

The engagement of the register wheels with the adding bars for the various calculating operations is achieved by the turning of the register wheel carriage, hereinbefore described, into the correct position. This is carried out by the register wheel locking mechanism as follows: The cylindrical bar 27 (FIGS. 6–9) extending through and being movable in the arcuate slot 28 to the right of the right assembly plate has fixed to its end a plate 55 carrying the control pins for effecting the engagement of the correct register wheels with the adding bars 3 for the adding, subtracting, total and subtotal operations. The plate 55 is pivotally attached to the gudgeon 26 extending through the right assembly plate. The plate 55 carries pin 56 destined to be engaged for adding, pin 57 destined to be engaged for subtracting, pin 58 destined to be engaged for registering total and subtotal and a push-over pin 59 to be used for the total and subtotal operations, the pins 56, 57, 58 all being engaged for their operation by a control fork member 60, while pin 59 is acted on by control means which are described in my aforementioned copending U.S. patent application No. 77,437. The fork 60 is pivotally attached at its top at 61b to one end of an engagement lever 61 which is pivotally fixed with its other end at 61' to the right assembly plate. A cam follower 61a is provided on lever 61 for engagement with an operating plate cam 62a turnable with the main control shaft 62. An intermediate lever 63 is pivotally and slidably attached by a pin 63a at one end in a slot 60a of the fork 60, its other end carrying a cam follower 63b engaged in control means, likewise described and claimed in my said patent application. The lever 63 is pivotally fixed at a point 63' between its two ends to the right assembly plate. A spring 60b urges the fork downwards at all time. Owing to the relative positions of cam follower 63b which is determined by the control mechanism, the fork 60 engages in FIG. 6 the adding pin 56. At this point the surface of plate cam 62a is so coordinated that the follower 61a is lifted, lifting the pivotal connection 61b between lever 61 and fork 60, whereby the latter turns plate 55 and bar 27 so that the adding registering wheels 22 are brought into engagement with the adding bars 3 before the latter's return stroke. In FIG. 7 is shown the engagement of the subtracting pin 57 with the fork 60. This shifting of the fork achieved by pin 63a whose position in slot 60a is determined by follower 63b actuated on by the said control mechanism. Similarly as with the adding operation the fork 60 is lifted owing to the action of can 62a on follower 61a so that the subtraction registering wheels 23 are brought into register with the adding bars on the latters' return stroke. During the operation of registering a subtotal (FIG. 9), the push-over pin 59 is initially pushed by means provided on said control mechanism so that the registering wheels 22 are brought into engagement with the adding bars 3 on the latter's forward stroke. By the same control mechanism the pin 63a is so positioned in slot 60a that fork 60 does not engage any pin on plate 55. The lifting of fork 60 through cam 62a does therefore not disengage the wheels from the adding bars during the return stroke of the latter. Only after this return movement has been completed is the pin 59 pushed back into its original position by the said control means. When a total is to be registered (FIG. 8) the pin 59 receives an initial push by the above-mentioned means before the start of the forward stroke of the adding bars 3 and brings the wheels 22 in register with the adding bars. The fork 60 is brought into engagement with pin 58 and when it is lifted before the start of the return stroke of the adding bars, the register wheels 22 are brought out of engagement with the bars. Since owing to the cam positions, the wheels 22 are again in register with the adding bar at the end of the return stroke of the latter, they have to be disengaged and this is done by forcing the pin 59 in a direction opposite to its initial movement by the abovementioned means described in my copending patent application.

After any desired operation above described has been completed, the adding bars 3 and the transfer members 17 which have operated, and the carriage must all be returned into their positions of rest before a new operation cycle is started.

In the case of the adding bars on which a ten-transfer has taken place and the transfer members which have been actuated the return is accomplished by means of a flat strip member 64 (FIG. 10) adapted to push against the abutment 21a of locking member 21 to push the latter and thus the adding bar 3 backwards by the width of one tooth. Strip 64 is fixed between two plates 65 disposed on the inside of both assembly plates and fixed spacedly to each other by means of rod 66 which extends through an arcuate slot in the left plate 65 and through the left assembly plate 1. The plates 65 are pivotal on axis 67 extending through both assembly plates to the outside. A straight lever 68 is mounted adjacent to the left assembly plate being fixedly at its center to the extension of rod 66 and with one end to the axis 67. The other end of lever 68 carries a roller 68a which runs on a cam turning with main control shaft 62. As this cam actuates the roller 68a and thus lever 68, plates 65 turn with the axis 67 causing bar 64 to push the abutment 21a out of engagement with cut-out 17" of the transfer member. Simultaneously the bar 19 must push against the handle 17a of transfer member 17 to allow notch 17a' to be removed from plate 18 so that the transfer member can be pulled downwards by means of spring 20 into its starting position. This movement is accomplished by fixing bar 19 with its left end in the top corner of a substantially triangular lever plate 69 lying adjacent the left assembly plate. The frontwardly extending bottom corner of plate 69 is fixed to axis 69b which extends through the left and right assembly plates so that the plate turns with the axis 69b while the backwardly extending corner of lever plate 69 is shaped into a hook 69a adapted to be lifted upwards by a roller (not shown) on the said cam turning with shaft 62. As the hook 69a is lifted by the cam, the bar 19 pushes the transfer member backwards to allow spring 20 to pull it downwards into its starting position.

After all calculating operations have been terminated the carriage is returned to its starting position, i.e. to the right of the machine. For this purpose a bar 74 (FIG. 11) is provided on the left side of the left assembly plate which bar is longitudinally movable and is guided in this movement by two posts 75 extending through slots 74a in the bar. To the rear end of bar 74 a hook lever 76 is pivotally fixed which is adapted to be engaged by a pin on a cam (not shown) mounted on the main control axis 62. The front end of bar 74 has a hook 74b integrally fixed to it which is in engagement with a pin 77a extending upwardly from a lever 77 which is pivotally mounted on a bridge member 78 fixed between the left and right assembly plates. Lever 77 extends through a transverse slot 1a in the front of the left assembly plate and its lever arm 77b carries a roller 77b' which abuts against the left flange 41' of the carriage 33. When the hook lever 76 is engaged by the pin on said cam the entire bar 74 is moved forward causing hook 74b to move pin 77a forward whereby lever 77 is turned on its pivot and causes the roller 77b' to push the carriage 33 to the right along axis 42 against the force of spring 44. During this movement of the carriage towards the right to the outside of plate 2 it passes a ramp surface 79 mounted at the bottom of cutout 43, against which the bottom of the depressed pins strike and by which they are forced upward into their inoperative position, the pin 32 associated with the number "9" of the left-most column of pins abutting the lug 53c on the keyboard as hereinbefore described and preventing thereby a movement of the carriage to the left.

During multiplication, the carriage 33 must stay in place. This is done by inactivating the bar 74 for the number of repeated additions necessary. For this purpose a lever bar 80 fixed to the left end of the axle 81 is provided, the axle being rotatably mounted in the left and right assembly plates and having a lever bearing the operations key designated for multiplication (not shown) fixed to it. The rear end of the lever bar 80 has a notch 80a engaged by a pin 76a provided on the hook lever 76. When the multiplication key and its lever is depressed, causing axle 81 to turn, the lever bar 80 bears down on pin 76a causing the hook lever 76 to be lifted from engagement with the cam, whereby the bar 74 cannot be pulled forward by the pin on the said cam.

Having now particularly described and ascertained the nature of my said invention and in what manner the same is to be performed, I declare that what I claim is:

In a mechanical adding listing machine longitudinally moving adding bars, type bars, said adding bars being connected to said type bars, means for effecting movement of said adding bars, a paper carrying roller, means for applying pressure to said roller for printing the amount of movement of said adding bars, a register consisting of a set of gear wheels having a plurality of teeth made up in multiples of ten, zero carrying members attached to said adding bars, means for slidably moving said zero members with respect to said adding bars at right angles to said printing member, a plurality of zero actuating levers, means including cams on said zero actuating levers controlled by the leftmost adding bar for selectively controlling operation of said zero members for effecting printing operation thereof, said last means including a lug, a cam on said adding bar for moving said lug to one side of said zero actuating lever of the adding bar, said actuating lever being provided with a pin for rotating said actuating lever, a lug resting on said pin for rotating and selectively controlling printing of said zero bars.

References Cited in the file of this patent

UNITED STATES PATENTS

| | | |
|---|---|---|
| 1,198,487 | Sundstrand | Sept. 19, 1916 |
| 1,533,119 | Lasker | Apr. 14, 1925 |
| 1,953,557 | Greve | Apr. 3, 1934 |
| 2,130,723 | Kottmann | Sept. 20, 1938 |
| 2,203,336 | Landsiedel | June 4, 1940 |
| 2,557,585 | Wockenfuss | June 19, 1951 |
| 2,688,439 | Landsiedel | Sept. 7, 1954 |
| 2,942,776 | Anderson | June 28, 1960 |